United States Patent
Wolf (10) Patent No.: US 12,130,733 B2
(45) Date of Patent: Oct. 29, 2024

(54) SYSTEMS AND METHODS FOR SCANNING USER INTERFACE (UI) SCREENS FOR ACCESSIBILITY COMPLIANCE

(71) Applicant: The ADT Security Corporation, Boca Raton, FL (US)

(72) Inventor: Scott Wolf, Denton, TX (US)

(73) Assignee: The ADT Security Corporation, Boca Raton, FL (US)

(*) Notice: Subject to any disclaimer, the term of this patent is extended or adjusted under 35 U.S.C. 154(b) by 0 days.

(21) Appl. No.: 18/088,345

(22) Filed: Dec. 23, 2022

(65) Prior Publication Data
US 2024/0211376 A1    Jun. 27, 2024

(51) Int. Cl.
G06F 11/36    (2006.01)

(52) U.S. Cl.
CPC ...... *G06F 11/3696* (2013.01); *G06F 11/3604* (2013.01)

(58) Field of Classification Search
CPC ............................................. G06F 11/36–3696
See application file for complete search history.

(56) References Cited

U.S. PATENT DOCUMENTS

| | | | |
|---|---|---|---|
| 7,448,023 B2 | 11/2008 | Chory et al. | |
| 7,484,092 B2 * | 1/2009 | Rajasekaran | G06F 16/10 713/165 |
| 7,610,277 B2 * | 10/2009 | Brady | G06F 16/332 |
| 7,657,844 B2 | 2/2010 | Gibson et al. | |
| 8,196,104 B2 | 6/2012 | Cohrs et al. | |
| 9,323,418 B2 * | 4/2016 | DiVita | G06F 8/36 |
| 9,563,422 B2 | 2/2017 | Cragun et al. | |
| 10,579,346 B2 | 3/2020 | Yan | |
| 11,360,769 B1 * | 6/2022 | Schwarz | G06F 9/3001 |
| 11,455,366 B2 | 9/2022 | Wiley | |
| 2002/0174355 A1 * | 11/2002 | Rajasekaran | G06F 16/10 707/E17.135 |
| 2003/0210266 A1 | 11/2003 | Cragun et al. | |
| 2003/0236797 A1 * | 12/2003 | Nita | G06F 16/00 |
| 2004/0148568 A1 | 7/2004 | Springer | |
| 2007/0234308 A1 | 10/2007 | Feigenbaum et al. | |
| 2008/0243810 A1 * | 10/2008 | Brady | G06F 16/332 707/999.005 |
| 2012/0203806 A1 * | 8/2012 | Panushev | G06Q 10/06 707/825 |
| 2014/0068470 A1 * | 3/2014 | DiVita | G06F 8/36 715/762 |
| 2014/0279056 A1 * | 9/2014 | Sullivan | G06Q 30/0275 705/14.71 |

(Continued)

*Primary Examiner* — Todd Aguilera
(74) *Attorney, Agent, or Firm* — Weisberg I.P. Law, P.A.

(57) ABSTRACT

Test devices, apparatuses, methods, and systems are disclosed. A test device for testing accessibility of a user interface is described. The test device comprises processing circuitry configured to generate a data structure based on a plurality of user interface files. The data structure comprises a plurality of data structure nodes, and each user interface file comprises a plurality of file elements associated with the accessibility of the user interface. Each data structure node of the plurality of data structure nodes corresponds to one or more file elements of the plurality of file elements. An accessibility test of the user interface is performed based on the data structure.

18 Claims, 7 Drawing Sheets

(56) References Cited

U.S. PATENT DOCUMENTS

| | | | |
|---|---|---|---|
| 2014/0351796 A1* | 11/2014 | Gur-Esh | G06F 11/3644 717/126 |
| 2015/0193091 A1* | 7/2015 | Cragun | G06F 8/77 715/763 |
| 2022/0121723 A1* | 4/2022 | Page | G06F 11/0784 |

* cited by examiner

SYSTEMS AND METHODS FOR SCANNING USER INTERFACE (UI) SCREENS FOR ACCESSIBILITY COMPLIANCE

TECHNICAL FIELD

The present disclosure relates to user interfaces, and in particular, to testing of software user interfaces based on accessibility requirements.

BACKGROUND

Color vision deficiency, which is often called "color blindness," refers to a decreased ability to perceive color or differences in color. Color vision deficiency affects many people, including their ability to interact with computing systems, such as via a user interface (UI). Examples of UIs include web pages or other software application graphical user interfaces (GUIs).

Some UIs, such as UIs used in home alarm systems, convey critical information about home and family safety. It may be important for all users, including users who have color vision deficiency, of the UI to be able to quickly determine the state of their home alarm system when using the UI.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

One or more embodiments of the present disclosure may facilitate compliance of UI elements with UI accessibility standards (e.g., web accessibility standards). In some embodiments, accessibility of UIs is tested for color and text contrast, ensuring that users who have color vision deficiency can command and control the UI (e.g., the UI for controlling and monitoring a home security system). One or more embodiments allow for collaboration between designers and developers throughout all phases of iterative development, thereby ensuring that early accessible design decisions are correctly maintained. In some embodiments, UI files (e.g., canonical UI files) are scanned, and reports (e.g., on a per unit basis) are generated. Further, one or more embodiments may facilitate identifying one or more elements in the UI that do not meet compliance standards across multiple applications.

Before describing in detail exemplary embodiments, it is noted that the embodiments may reside in combinations of apparatus components and processing steps related to testing the accessibility of user interfaces. Accordingly, components may be represented where appropriate by conventional symbols in the drawings, so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes," "including" "has" and/or "having" when used herein, specify the presence of stated features, integers, steps, operations, elements, and/or components, but do not preclude the presence or addition of one or more other features, integers, steps, operations, elements, components, and/or groups thereof. In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "device" used herein can be any kind of network device comprised in a network (or standalone). In a non-limiting example, a device may be a test device configured to test accessibility of user interfaces and may be comprised in (and/or in communication with components of) a system associated with a premises security system. In another nonlimiting example, the test device may be standalone configured to test accessibility of user interfaces, e.g., using information locally stored in the device. In some embodiments, the test device may comprise one or more of a system, server, client, a computing device, a smart device, a software engine, etc.

In some embodiments, the term "accessibility" (e.g., of user interfaces) is used and may refer to an ability of a UI user (such as a person with disabilities) to access and use the UI. In some other embodiments, accessibility refers to graphic and text arrangements, technologies, tools, etc. used such that people with disabilities can access and use user interfaces. In a non-limiting example, accessibility of a user interface may be achieved when users with a disability can perceive, understand, navigate, and interact with the user interface, contribute to the user interface, etc. Accessibility may comprise arrangements for a plurality of disabilities that affect access to the user interfaces such as auditory, cognitive, neurological, physical, speech, visual, etc. In some cases, accessibility may benefit users without disabilities.

In one or more embodiments, the term "user interface" is used and may refer to a space where a user (e.g., human) interacts with a machine or computer or system. In some embodiments, the user interface may comprise a rendering of a site, such as a website; a rendering of a page, such as a web page; a software application interface, such as a graphical user interface; a human-machine interface (HMI), etc. In one or more embodiments, user interface may refer to the components and/or elements of the user interface which may include file directories, files, file elements, parameters such as configuration parameters, images, text, video, audio, and/or hardware associated with the user interface such as a display. In a non-limiting example, the user interface may refer to one or more files that are used or usable to build a graphical user interface (comprising text and images) accessible (or not accessible) to persons with disabilities. A user interface may include one or more files that include file elements that describe properties of the user interface components such as images and text. The properties described may comprise values usable to determine whether a component of the user interface meets accessibility requirements.

In some embodiments, the term data structure is used and may refer to an arrangement or organization of data. In a non-limiting example, a data structure may comprise a tree, a stack, a queue, a graph, a list (e.g., linked list), a table, an array, a file (e.g., comprising file elements), etc. Each data structure may comprise one or more data structure nodes. In some embodiments, the arrangement of the nodes defines at least in part the data structure. For example, the arrangement of data structure nodes may define a tree, where a first data structure node is the root node, and other data structure nodes (children) are arranged to be hierarchically inferior (e.g., at a level different from the root node) and/or connected via an edge or node connector. A tree may comprise one or more other trees (e.g., a sub-tree). In another example, the data structure is a file that includes one or more nested file elements usable to create another data structure such as a tree. Each data structure may comprise data (e.g., from one or more sources such as files, file elements, user interfaces, etc.). The data may be stored and/or assigned and/or correspond to one or more data structure nodes.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Figure 1:
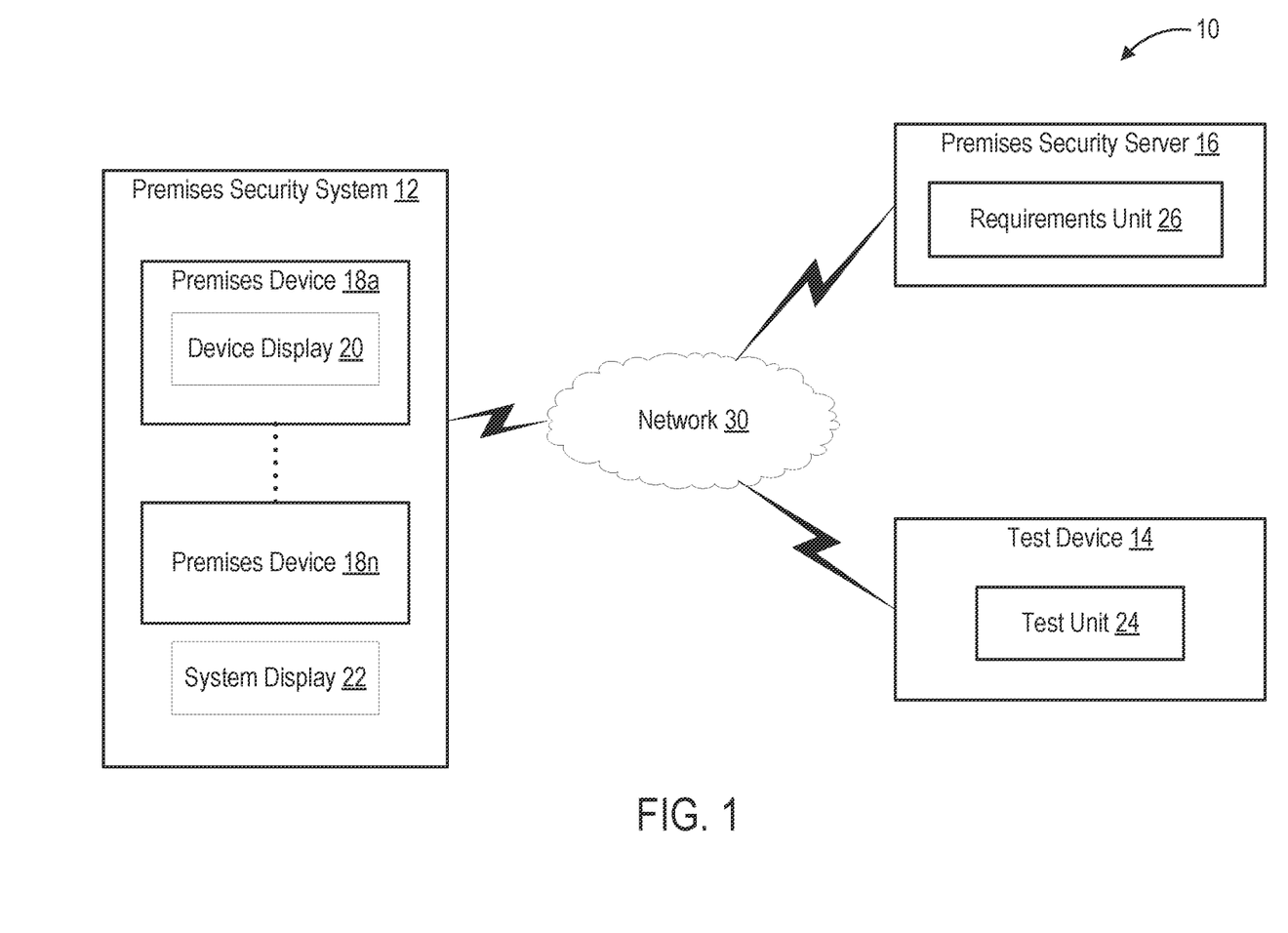
FIG. 1 is a schematic diagram of various devices and components according to some embodiments of the present disclosure.

Referring now to the drawing figures, in which like elements are referred to by like reference numerals, there is shown in FIG. 1 is a schematic diagram of a system 10. System 10 may include a premises security system 12, test device 14, and premises security server 16. In some embodiments, premises security system 12 and test device 14 may be located at a premises such as a subscriber's house, vehicle, or office building. Premises security server 16 may be a remote server, such as a cloud computing server, or may be co-located with premises security system 12. In one or more embodiments, premises security system 12, test device 14, and premises security server 16 may be configured to communicate with each other via one or more communication links and/or protocols. Further, premises security system 12 may be configured to provide information associated with premises security system 12 and test device 14 such as user interface information and/or files.

Further, system 10 may include network 30, which may be configured to provide direct/indirect communication, e.g., wired and/or wireless communication, between any two or more components of system 10, e.g., premises security system 12, test device 14, premises security server 16. Although network 30 is shown as an intermediate network between components/devices of system 10, any component or device may communicate directly with any other component or device of system 10. For example, network 30 may be an internet protocol (IP) network that may be established as a wide area network (WAN) and/or local area network (LAN), among other IP-based networks, etc.

Premises security system 12 may include one or more premises devices 18a-18n (collectively, premises devices 18). One or more premises devices 18 may include a device display 20. Further, premises security system 12 may comprise a system display 22. Any of the device display 20 and system display 22 may be configured to display a user interface (e.g., a web page, a graphical user interface of a software) and/or be a user interface (e.g., a graphical user interface and hardware configured to display the graphical user interface).

Premises devices 18 may be configured to monitor doors, driveway gates, windows, and other openings, or to control lights, appliances, HVAC systems (e.g., temperature, cooling, heating, exhaust fans, etc.), access control, door locks, lawn sprinklers, etc. For example, one or more premises devices 18 may be used to sense motion and other alarm conditions, such as glass breaking, fire, smoke, temperature, chemical compositions, water, carbon monoxide, or other hazardous conditions. Premises device 18 may include video cameras that may be used to detect motion and/or capture video of events, and or other sensor that are not particularly limited and may also include any number of health, safety, and lifestyle devices. Examples of lifestyle devices include medical condition monitors and personal emergency response systems, thermostats, appliance modules, key fobs, keypads, touch screens, a gateway router, etc. The term "premises" as used herein is not limited to a home and may refer to a vehicle, such as a boat, office suite, industrial building, or any other indoor or outdoor area where control of premises devices 18 is desired.

Further, test device 14 may include test unit 24. Test unit 24 may be implemented by any device, either standalone or part of test device 14, configurable for generating a data structure and/or performing an accessibility test of a user interface (e.g., associated with device display 20, system display 22, or any other display or device).

Premises security server 16 may include requirements unit 26. Requirements unit 26 may be implemented by any device, either standalone or part of premises security server 16, e.g., configurable for providing information associated with the accessibility of user interfaces such as requirements established by one or more standards entities.

Premises security server 16 functionality may be performed by a single server or distributed among multiple servers or computing devices. For example, premises security server 16 functionality, as described herein, may be performed by an on-site or off-site server. Alternatively, premises security server 16 functionality may be performed by several computing devices that may be located in the same general location or different locations, e.g., cloud computing. In other words, each computing device may perform one or more particular sub-processes of premises security server 16 and may communicate with each other via network 30.

Figure 2:
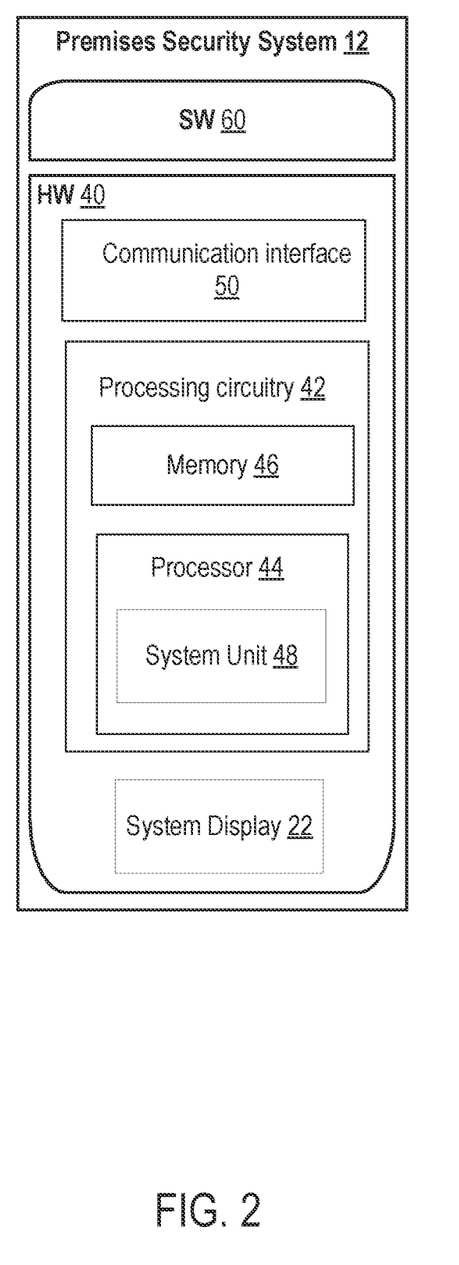
FIG. 2 is a block diagram of an example premises security system according to some embodiments of the present disclosure.

Referring now to FIG. 2, premises security system 12 may include hardware 40, including processing circuitry 42, communication interface 50, and/or system display 22. The processing circuitry 42 may include a memory 46 and a processor 44. In addition to, or instead of a processor, such as a central processing unit, and memory, the processing circuitry 42 may comprise integrated circuitry for processing and/or control, e.g., one or more processors, processor cores, field programmable gate arrays (FPGAs), and/or application specific integrated circuits (ASICs) adapted to execute instructions. The processor 44 may be configured to access (e.g., write to and/or read from) the memory 46, which may comprise any kind of volatile and/or nonvolatile memory, e.g., cache, buffer memory, random access memory (RAM), read-only memory (ROM), and/or optical memory and/or erasable programmable read-only memory (EPROM). Communication interface 50 may comprise and/or be configured to support communication with any components of system 10 or any other component or device using any communication protocol.

Premises security system 12 may further include software 60 stored internally in, for example, memory 46 or stored in external memory (e.g., database, storage array, network storage device, etc.) accessible by premises security system 12 via an external connection. The software 60 may be executable by the processing circuitry 42. The processing circuitry 42 may be configured to control any of the methods and/or processes described herein and/or to cause such methods, and/or processes to be performed, e.g., by premises security system 12. Processor 44 corresponds to one or more processors 44 for performing premises security system 12 functions described herein. The memory 46 is configured to store data, programmatic software code and/or other information described herein. In some embodiments, the software 60 may include instructions that, when executed by the processor 44 and/or processing circuitry 42, causes the processor 44 and/or processing circuitry 42 to perform the processes described herein with respect to premises security system 12. For example, processing circuitry 42 of the premises security system 12 may include system unit 48 configured to perform one or more premises security system 12 functions as described herein such as transmit one or more files associated with a user interface, e.g., files displayable by system display 22 or any other display.

Communication interface 50 may include at least a radio interface configured to set up and maintain a wireless connection with network 30. The radio interface may be formed as, or may include, for example, one or more radio frequency, RF transmitters, one or more RF receivers, and/or one or more RF transceivers. Communication interface 50 may include a wired communication interface, such as Ethernet, configured to set up and maintain a wired connection with network 30.

Figure 3:
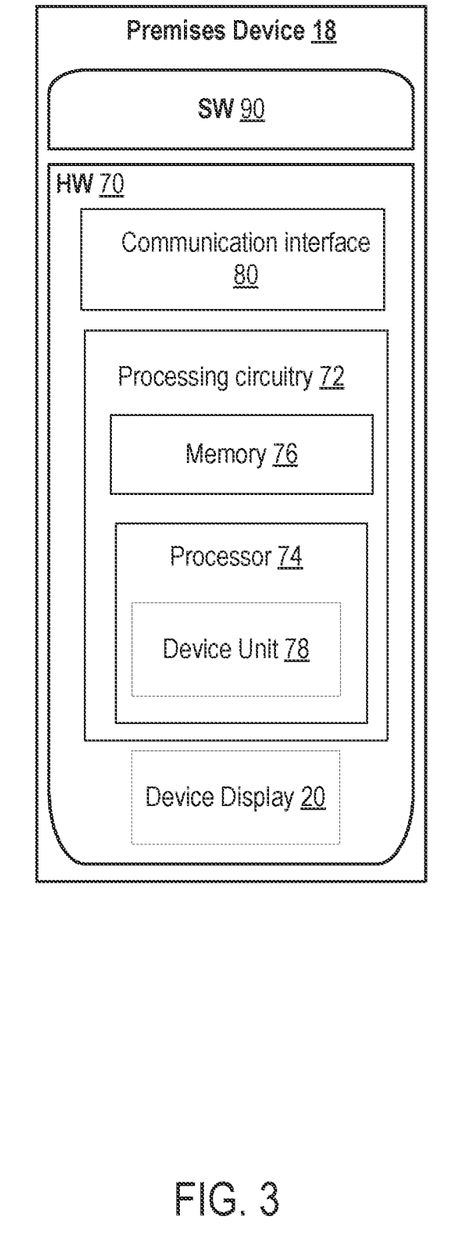
FIG. 3 is a block diagram of an example premises device according to some embodiments of the present disclosure.

Referring now to FIG. 3, the system 10 further includes premises device 18, such as premises device 18a, which may be included as part of premises security system 12 (shown in FIG. 1). Premises device 18 may include hardware 70, including processing circuitry 72, communication interface 80, and/or device display 20. The processing circuitry 72 may include a memory 76 and a processor 74. In addition to, or instead of a processor, such as a central processing unit, and memory, the processing circuitry 72 may comprise integrated circuitry for processing and/or control, e.g., one or more processors, processor cores, field programmable gate arrays (FPGAs), and/or application specific integrated circuits (ASICs) adapted to execute instructions. The processor 74 may be configured to access (e.g., write to and/or read from) the memory 76, which may comprise any kind of volatile and/or nonvolatile memory, e.g., cache, buffer memory, random access memory (RAM), read-only memory (ROM), optical memory, and/or erasable programmable read-only memory (EPROM). Communication interface 80 may comprise and/or be configured to support communication with any components of system 10 or any other component or device using any communication protocol.

Premises device 18 may further include software 90 stored internally in, for example, memory 76 or stored in external memory (e.g., database, storage array, network storage device, etc.) accessible by premises device 18 via an external connection. The software 90 may be executable by the processing circuitry 72. The processing circuitry 72 may be configured to control any of the methods and/or processes described herein and/or to cause such methods, and/or processes to be performed, e.g., by premises device 18. Processor 74 corresponds to one or more processors 74 for performing premises device 18 functions described herein. The memory 76 is configured to store data, programmatic software code and/or other information described herein. In some embodiments, the software 90 may include instructions that, when executed by the processor 74 and/or processing circuitry 72, causes the processor 74 and/or processing circuitry 72 to perform the processes described herein with respect to premises device 18. For example, processing circuitry 72 of the premises device 18 may include device unit 78 configured to perform one or more premises device 18 functions as described herein such as transmitting one or more files associated with a user interface, e.g., files displayable by device display 20 or any other display.

Communication interface 80 may include at least a radio interface configured to set up and maintain a wireless connection with network 30. The radio interface may be formed as, or may include, for example, one or more radio frequency, RF transmitters, one or more RF receivers, and/or one or more RF transceivers. Communication interface 50 may include a wired communication interface, such as Ethernet, configured to set up and maintain a wired connection with network 30.

Figure 4:
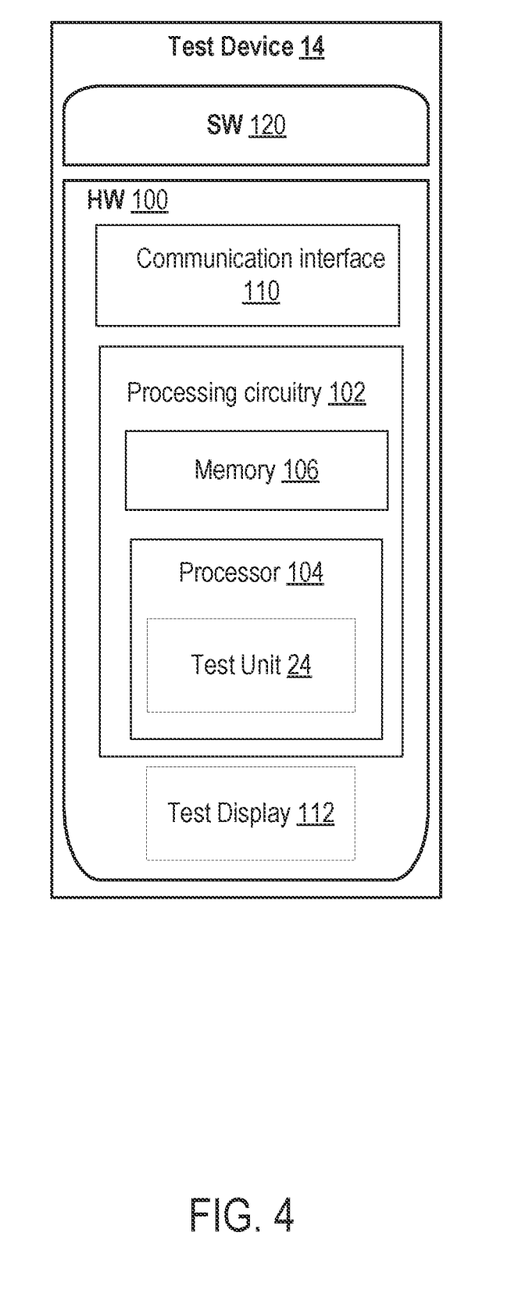
FIG. 4 is a block diagram of an example test device according to some embodiments of the present disclosure.

Referring now to FIG. 4, the system 10 further includes test device 14. Test device 14 may include hardware 100, including processing circuitry 102, communication interface 110, and/or test display 112. The processing circuitry 102 may include a memory 106 and a processor 104. In addition to, or instead of a processor, such as a central processing unit, and memory, the processing circuitry 102 may comprise integrated circuitry for processing and/or control, e.g., one or more processors, processor cores, field programmable gate arrays (FPGAs), and/or application specific integrated circuits (ASICs) adapted to execute instructions. The processor 104 may be configured to access (e.g., write to and/or read from) the memory 106, which may comprise any kind of volatile and/or nonvolatile memory, e.g., cache, buffer memory, random access memory (RAM), read-only memory (ROM), and/or optical memory and/or erasable programmable read-only memory (EPROM). Communication interface 110 may comprise and/or be configured to support communication with any components of system 10 or any other component or device using any communication protocol.

Test device 14 may further include software 120 stored internally in, for example, memory 106 or stored in external memory (e.g., database, storage array, network storage device, etc.) accessible by test device 14 via an external connection. The software 120 may be executable by the processing circuitry 102. The processing circuitry 102 may be configured to control any of the methods and/or processes described herein and/or to cause such methods, and/or processes to be performed, e.g., by test device 14. Processor 104 corresponds to one or more processors 104 for performing test device 14 functions described herein. The memory 106 is configured to store data, programmatic software code and/or other information described herein. In some embodiments, the software 120 may include instructions that, when executed by the processor 104 and/or processing circuitry 102, causes the processor 104 and/or processing circuitry 102 to perform the processes described herein with respect to test device 14. For example, processing circuitry 102 may include test unit 24 configured to perform one or more test device 14 functions as described herein such as receiving one or more files associated with a user interface, e.g., files displayable by device display 20 and/or system display 22 any other display, and/or generate a data structure and/or perform an accessibility test based on the data structure.

Communication interface 110 may include at least a radio interface configured to set up and maintain a wireless connection with network 30. The radio interface may be formed as, or may include, for example, one or more radio frequency, RF transmitters, one or more RF receivers, and/or one or more RF transceivers. Communication interface 110 may include a wired communication interface, such as Ethernet, configured to set up and maintain a wired connection with network 30.

Figure 5:
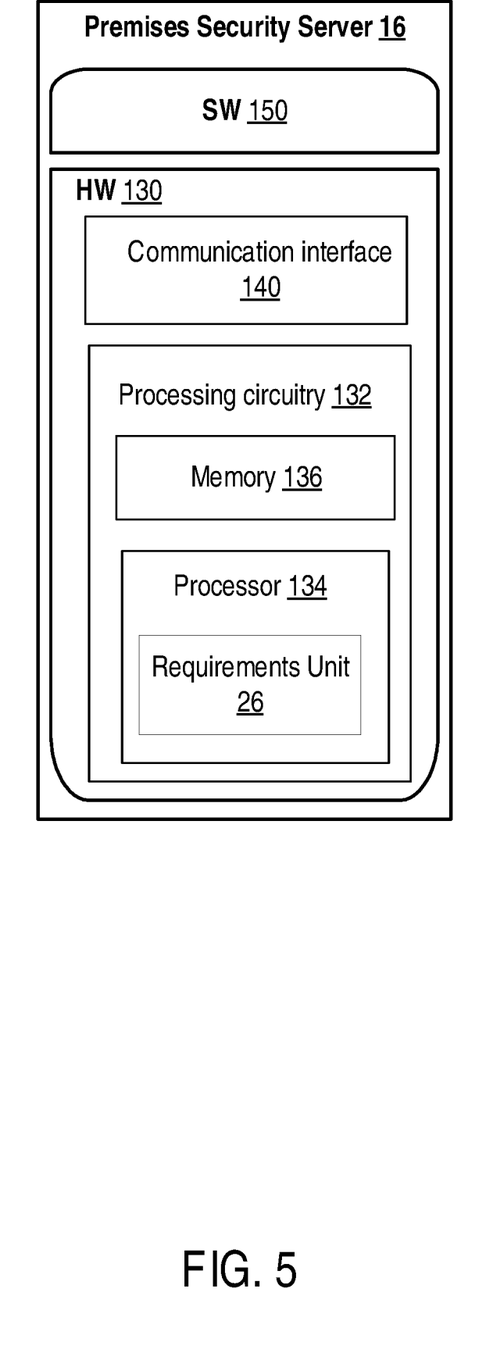
FIG. 5 is a block diagram of an example premises security server according to some embodiments of the present disclosure.

Referring now to FIG. 5, the system 10 further includes premises security server 16. Premises security server 16 may include hardware 130, including processing circuitry 132, communication interface 140. The processing circuitry 132 may include a memory 136 and a processor 134. In addition to, or instead of a processor, such as a central processing unit, and memory, the processing circuitry 132 may comprise integrated circuitry for processing and/or control, e.g., one or more processors, processor cores, field programmable gate arrays (FPGAs), and/or application specific integrated circuits (ASICs) adapted to execute instructions. The processor 134 may be configured to access (e.g., write to and/or read from) the memory 136, which may comprise any kind of volatile and/or nonvolatile memory, e.g., cache, buffer memory, random access memory (RAM), read-only memory (ROM), and/or optical memory and/or erasable programmable read-only memory (EPROM). Communication interface 140 may comprise and/or be configured to support communication with any components of system 10 or any other component or device using any communication protocol.

Premises security server 16 may further include software 150 stored internally in, for example, memory 136 or stored in external memory (e.g., database, storage array, network storage device, etc.) accessible by premises security server 16 via an external connection. The software 150 may be executable by the processing circuitry 132. The processing circuitry 132 may be configured to control any of the methods and/or processes described herein and/or to cause such methods, and/or processes to be performed, e.g., by premises security server 16. Processor 134 corresponds to one or more processors 134 for performing premises security server 16 functions described herein. The memory 136 is configured to store data, programmatic software code and/or other information described herein. In some embodiments, the software 150 may include instructions that, when executed by the processor 134 and/or processing circuitry 132, causes the processor 134 and/or processing circuitry 132 to perform the processes described herein with respect to premises security server 16. For example, processing circuitry 132 may include requirements unit 26 configured to perform one or more premises security server 16 functions as described herein such as transmit one or more files associated with requirements of a user interface.

Communication interface 140 may include at least a radio interface configured to set up and maintain a wireless connection with network 30. The radio interface may be formed as, or may include, for example, one or more radio frequency, RF transmitters, one or more RF receivers, and/or one or more RF transceivers. Communication interface 140 may include a wired communication interface, such as Ethernet, configured to set up and maintain a wired connection with network 30.

Although FIGS. 2-5 show various units as being within a respective processor, these units may be implemented instead such that a portion of the unit is stored in a corresponding memory within the processing circuitry. In other words, the units may be implemented in hardware or in a combination of hardware and software within the processing circuitry.

Figure 6:
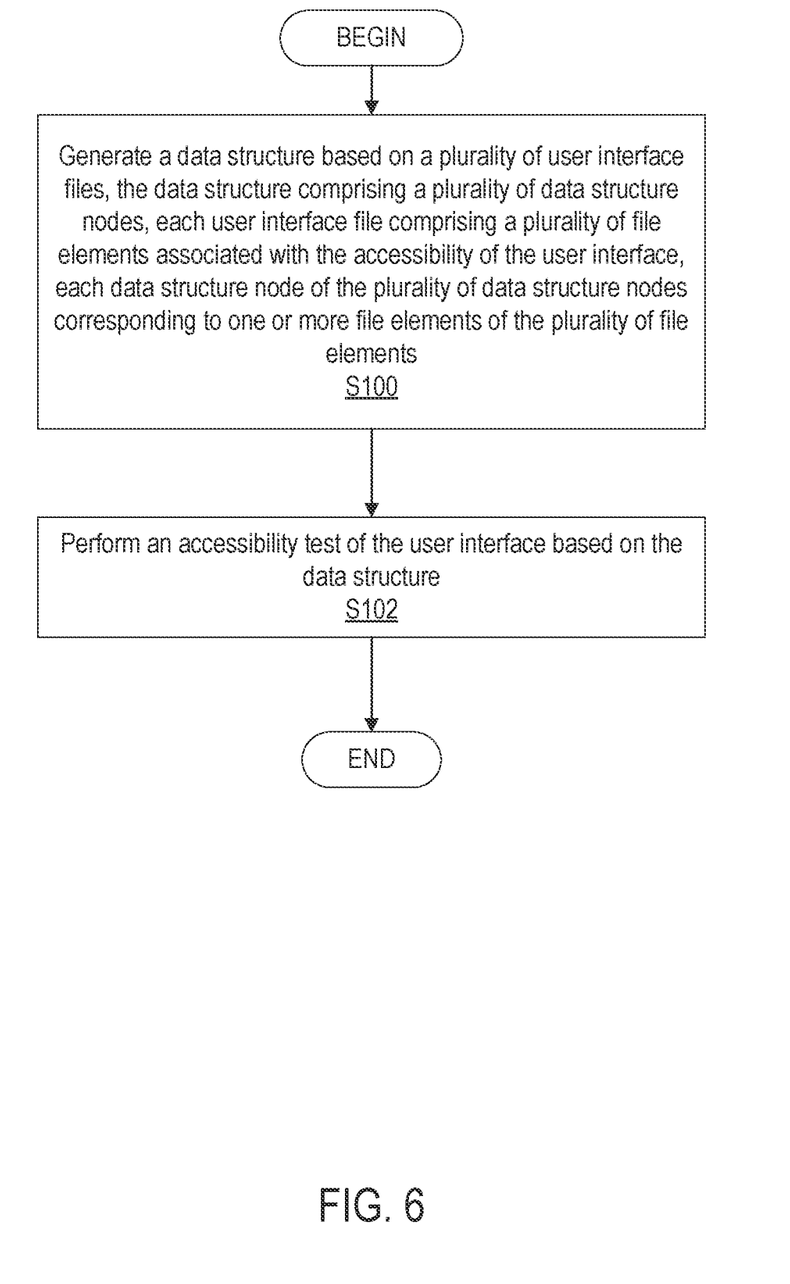
FIG. 6 is a flowchart of an example process in a test device according to some embodiments of the present disclosure.

FIG. 6 is a flowchart of an example process (i.e., method) implemented by a test device 14 according to some embodiments of the disclosure. One or more blocks described herein may be performed by one or more elements of test device 14 such as by one or more of processing circuitry 102, test unit 24, and/or communication interface 110. Test device 14 is configured to generate (Block S100) a data structure based on a plurality of user interface files. The data structure comprises a plurality of data structure nodes. Each user interface file comprises a plurality of file elements associated with the accessibility of the user interface. Each data structure node of the plurality of data structure nodes corresponds to one or more file elements of the plurality of file elements. Further, test device 14 is configured to perform (Block S102) an accessibility test of the user interface based on the data structure.

According to one or more embodiments, the method further comprises receiving a plurality of files comprising the plurality of user interface files and selecting the plurality of user interface files from the plurality of files based on a user interface type of each user interface file. The plurality of user interface files is selected to generate the data structure.

According to one or more embodiments, the selection of the plurality of files includes opening each file of the plurality of files, reading each file of the plurality of files, and searching for a predetermined keyword associated with the user interface.

According to one or more embodiments, the method further comprises searching for a supporting file associated with one user interface file in a file directory where the one user interface file is stored and, if the supporting file is found in the file directory, moving the one user interface file and the supporting file to a processing directory to generate the data structure.

According to one or more embodiments, the method further comprises verifying and selecting, using an aggregate parser, a concrete parser to generate the data structure.

According to one or more embodiments, the data structure is a tree (e.g., logical tree or structure), one data structure node is a root node, and one or more data structure nodes are children nodes of the root node.

According to one or more embodiments, the method further comprises opening each user interface file and making a first file element of the plurality of file elements the root node. The first file element is associated with a text or an image.

According to one or more embodiments, the method further comprises making a second file element that is nested under the first file element a child node of the root node.

According to one or more embodiments, the accessibility test is performed between the root node and one or more corresponding children nodes. The method further comprises generating a test result indicating whether one or more of the file elements passed or failed the accessibility test based on a predetermined standard.

According to one or more embodiments, the method further comprises determining a luminance parameter associated with a file element based on color information that is represented as hexadecimal string or based on an image file. Further, the luminance parameter is inserted in a corresponding data structure node.

Having described the general process flow of arrangements of the disclosure and having provided examples of hardware and software arrangements for implementing the processes and functions of the disclosure, the sections below provide details and examples of arrangements for automatically scanning and/or testing user interface (e.g., files, screens) for accessibility compliance.

In some embodiments, system 10 and/or test device 14 provides ways to scan IPHONE operating system (iOS), web, and ANDROID user interface (UI) screens and/or files, e.g., to determine whether the screens and/or files meet minimum and enhanced color contrast ratios for text and images such as defined by standards and/or requirements promulgated by standards organizations, e.g., World Wide Web Consortium (W3C).

Test device 14 may be configured to allow users (e.g., clients) to upload files, such as development platform specific UI files, create a data structure representation (e.g., tree representation) of elements such as file elements, and/or run compliance tests on the elements (e.g., represented by the data structure) based on the element type, image to image, or text to text. Test device 14 may further be configured to generate reports, such as on a per-screen basis and/or flags individual elements as failing to meet the minimum or enhanced contrast ratios. This may help to standardize UI compliance across all deployments whether they are iOS, ANDROID, web, or any other operating system or firmware. It also facilitates automated compliance in an environment instead of mandating a waterfall style of creating upfront compliance or post-deployment checks. In one or more embodiments, one feature is the standardization of UI files into an internal platform agnostic UI tree (i.e., data structure). This allows for comparisons between similar UI screens that have been replicated across development platforms. For example, a login screen design that is shared between ANDROID and iOS applications can be standardized with regards to accessibility.

Further, test device 14 may be configured to be flexibly deployed. In some embodiments, test device 14 may be configured to provide a command line tool that scans directories for UI files. In another embodiment, test device 14 may be a deployable webserver that accepts UI files via hypertext transfer protocol (HTTP). Behavior (e.g., of test device 14) may be driven by a configuration file such as human-readable data-serialization language (i.e., having a YAML extension). The configuration file may drive what type of UI (web, ANDROID, IOS) files to scan, where to search for the files, and what external UI element file types (e.g., portable network graphics (PNG) or scalable vector graphics (SVG)) are valid. Files may be processed via a pipeline that comprises input, parsing, and runner (i.e., running or performing accessibility tests) steps, as will now be described.

The input step may be performed to manage UI files as the files enter the system (i.e., test device 14). Based on configuration values, a file can enter the test device 14 by being placed directly into a pre-configured folder (e.g., via YAML configuration values), or HTTP. UI files may be evaluated to determine if the UI files correspond to a UI type. This may be performed by opening and reading the file for specific keywords such as ANDROID, IOS, or JAVASCRIPT object notation (JSON) formatted keywords. For example, an ANDROID extensible markup language (XML) file may be configured to (and/or be usable by test device 14 to) look for (e.g., scan for) key values that comprise the string character "ANDROID". In some embodiments, scanning may be performed via regular expression (regex) pattern. Once the file is validated as a supported UI type, UI elements that are external files, such as a PNG logo, are searched for within the same working directory that the overall UI file was found in. If they are found, then the UI file and any supporting files are moved from the working directory to a processing directory. The main UI file may be referenced within the system (e.g., test device 14) as a "Work" which may comprise the new file path of the main UI file, and which of the supported UI types it represents.

According to various embodiments, the parsing step may begin after the input step has completed. Parsing may refer to transforming (e.g., generating, standardizing) UI files and any of their external elements into a data structure, such as a tree (e.g., UI tree). The transformation (e.g., standardization) allows for operations such as arbitrary operations to be run over the tree representation of the UI. In some embodiments, operations include color contrast tests for text, large text, and image elements. When the test device 14 receives data from the previous input step, the data is used by an aggregate parser, which may verify and select a concrete parser for the given UI type.

An aggregate parser (e.g., comprised in test unit 24) may be configured to work as a lookup table. In some embodiments, the aggregate parser may be configured to receive (e.g., get) work and check if the aggregate knows how to (e.g., determines whether the aggregate parser can) process the work into a tree (e.g., determine and generate a tree based on the work). A concrete parser (e.g., comprised in test unit 24) may be configured to read at least one file comprised in the work and convert the file to an internal data representation such as a standardized internal data representation. These parsers may be interfaced to provide a standard abstraction and/or take in data from the input step and output UI trees. Concrete parsers may differentiate themselves in the data required to standardize the given UI file into a UI tree. In some embodiments, all parsers follow the same pattern, but the present disclosure is not limited as such. In some other embodiments, the parsers first open the UI file and treat the first text or image value as the tree "root" (i.e., a root node of the data structure). Further, the parser may further traverse the UI file, creating elements out of the file and/or treating nested elements as children of the root.

In some embodiments, luminance calculations follow one of two paths. When a first path is followed, color information is represented as a hexadecimal string. For hexadecimal string colors, the string is converted to a standard red, green, blue, alpha (sRGBA) value, and the luminance is calculated (e.g., using formulas presented in the World Wide Web Consortium (W3C)) standards). A second path may be used for image files. In some embodiments, image files are assumed to be in the same working directory as the main UI file. One or more image types may be supported, such as PNG and SVG. PNG files may be processed by converting the file to greyscale, taking the root mean square (RMS) of all greyscale pixels, and treating them as a flat array of values. SVG files may be processed, where color values are scanned out as hexadecimal strings, and then converted to RGBA values and greyscaled. Then, the RMS of the SVG may be calculated. In some embodiments, to finish parsing, individual elements may be tagged as images, text, or large text. Further, individual fields in the specific UI file may drive metadata fields.

According to various embodiments, the runner step may execute after the parsing step. In the runner step, accessibility tests may be performed on the created UI trees. Tests may be performed between parents (i.e., data structure nodes of a higher level) and their children (i.e., data structure nodes of a lower level than and corresponding to the parent) all the way to the base of the tree. Results may be gathered in a JSON format and can be output to other services. The tests performed on each data structure node in the data structure (e.g., tree) may be driven by the type of element, e.g., as assigned on node creation.

In some embodiments, luminance is calculated or determined before an accessibility test is performed. However, the calculation or determination of the luminance is not limited as such and may be performed in any other order, e.g., during or after the accessibility test is performed. In some other embodiments, the accessibility test is performed based on the luminance.

Figure 7:
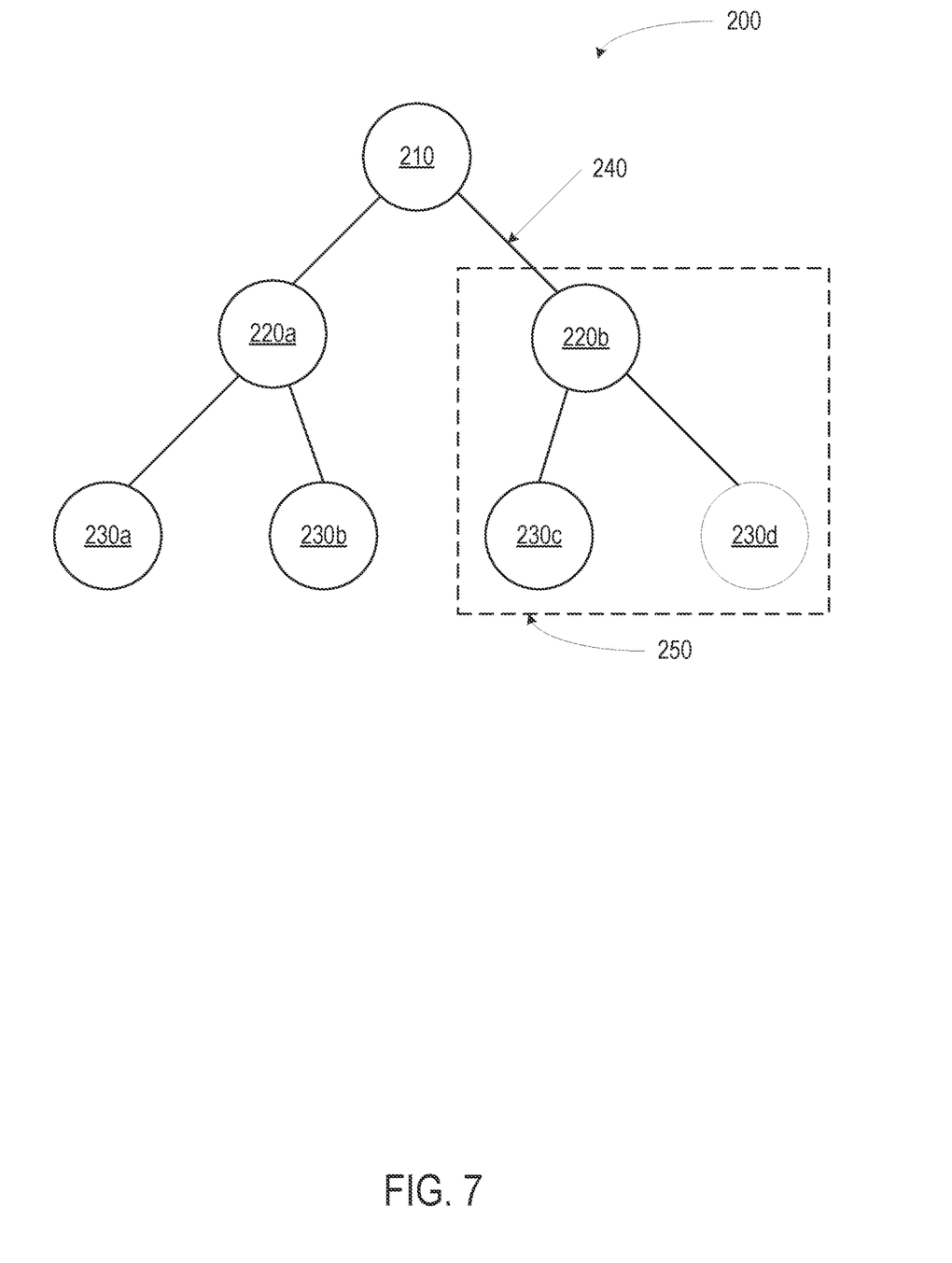
FIG. 7 shows an example data structure according to some embodiments of the present disclosure.

FIG. 7 shows an example data structure 200 according to some embodiments of the present disclosure. Data structure 200 of this nonlimiting example is a tree, where the data structure comprises one or more data structure nodes 210, 220, 230. Data structure node 210 is at a level 0 and is the root node and/or a parent node. Data structure nodes 220a, 220b are each a child node to data structure node 210 and may linked by edge 240 (e.g., shown between data structure node 210 and data structure node 220b). Further, Data structure nodes 220a, 220b are each at level 1. Further, data structure node 220a may be linked to data structure nodes 230a, 230b (e.g., each a child node to data structure node 220a). Similarly, data structure node 220b may be linked to data structure nodes 230c, 230d (e.g., each being a child node to data structure node 220b). Data structure nodes 230a, 230b, 230c, 230d are each at level 2. In addition, data structure 200 (e.g., tree) may comprise one or more other data structures 250 (e.g., sub-trees). In one or more embodiments, the tree shown in FIG. 7 is generated when one or more steps associated with the parsing step is performed.

A non-limiting example of a file input that may be used in the input step according to various embodiments follows:

File Input

```
{
  "root" : {
    "id": "Root",
    "metadata" : "text",
    "color_hex" : "#ffffff",
    "child_elements" :
    [
      {
        "id": "ffffff-Child",
```

File Input

```
        "metadata" : "text",
        "color_hex" : "#ffffff"
      },
      {
        "id": "000000-Child",
        "metadata" : "text",
        "color_hex" : "#000000"
      }
    ]
  }
}
```

A non-limiting example of an in-memory representation of a data structure generated in a parsing step according to various embodiments follows:

```
ID: Root
Luminance: 1.000000
Metadata: text
Children {
    ID: ffffff-Child
    Luminance: 1.000000
    Metadata: text
    ID: 000000-Child
    Luminance: 0.000000
    Metadata: text
}
```

A non-limiting example of a results that may be generated in the runner step according to various embodiments follows:

"test": "Minimum Contrast between Text and Background",
"id": "ffffff-Child",
"passed": false,
"reason": "expect contrast ratio: 4.500000. actual contrast ration 1.000000"
"test": "Enhanced Contrast between Text and Background",
"id": "ffffff-Child",
"passed": false,
"reason": "expect contrast ratio: 7.000000. actual contrast ration 1.000000"
"test": "Minimum Contrast between Text and Background",
"id": "000000-Child",
"passed": true
"test": "Enhanced Contrast between Text and Background",
"id": "000000-Child",
"passed": true As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The functions and acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as PYTHON, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

The embodiments described herein are not limited to what has been particularly shown and described herein above. In addition, unless mention was made above to the contrary, all of the accompanying drawings are not to scale. A variety of modifications and variations are possible in light of the above teachings without departing from the scope of the following claims.

What is claimed is:

1. A method implemented by a test device configured for standardizing a plurality of user interface files of a user interface into a platform agnostic data structure to allow for comparisons among the plurality of user interface files with regard to accessibility for users who have color vision deficiency, the method comprising:
    inputting the plurality of user interface files of the user interface, each user interface file of the plurality of user interface files being associated with a development platform and comprising a plurality of file elements in a logical tree structure, each of a first portion of the plurality of file elements comprising respective text, each of a remaining portion of the plurality of file elements comprising a respective image;
    for each of the plurality of user interface files:
        generating a platform agnostic data structure having the same logical tree structure as the plurality of file elements by at least:
            traversing the logical tree structure of the plurality of file elements, and for each one of the plurality of file elements:
                generating a node in the platform agnostic data structure;
                performing a luminance calculation of the text or image of the file element, the luminance calculation being based on:
                    a hexadecimal string based on the file element not comprising the respective image; and
                    a grey scaling process based on the file element comprising the respective image;
                storing a result of the luminance calculation of the file element in the node;
        performing an accessibility test of on each node in the platform agnostic data structure at least by:
            determining whether each file element meets a minimum or enhanced contrast ratio for accessibility compliance for users who have color vision deficiency based on the results of the luminance calculations for the plurality of file elements; and
            flagging file elements that fails to meet the minimum or enhanced contrast ratio for users who have color vision deficiency; and
        generating a test report indicating the flagged file elements that fail to meet the minimum or enhanced contrast ratio for users who have color vision deficiency.

2. The method of claim 1, further comprising:
    identifying a selected user interface file from the plurality of user interface files.

3. The method of claim 2, wherein the selection of the user interface file includes:

opening each file of the plurality of user interface files; and searching each of the plurality of user interface files for a predetermined keyword associated with development platform.

4. The method of claim 1, further comprising:

searching for a supporting file associated with the user interface file in a file directory where the user interface file is stored; and if the supporting file is found in the file directory, moving the user interface file and the supporting file to a processing directory, the data structure being generated based on the user interface file and the supporting file in the processing directory.

5. The method of claim 1, further comprising verifying and selecting a parser to traverse the logical tree structure of the plurality of file elements.

6. The method of claim 1, wherein the logical tree structure comprises a root node and a plurality of children nodes with respect to the root node.

7. The method of claim 6, further comprising:

for each user interface file of the plurality of user interface files:
  opening the user interface file; and
  making a first file element of the plurality of file elements the root node, the first file element being:
    positioned, in the user interface file, before the remaining plurality of file elements; and
    associated with a text or an image.

8. The method of claim 7, further comprising making a second file element that is nested under the first file element a child node of the root node.

9. The method of claim 6, further comprising generating a test result indicating whether each node in the logical tree structure passed or failed the accessibility test.

10. A test device for standardizing a plurality of user interface files of a user interface into a platform agnostic data structure to allow for comparisons among the plurality of user interface files with regard to accessibility for users who have color vision deficiency, the test device comprising processing circuitry configured to:

input the plurality of user interface files of the user interface, each user interface file of the plurality of user interface files being associated with a development platform and comprising a plurality of file elements in a logical tree structure, each of a first portion of the plurality of file elements comprising respective text, each of a remaining portion of the plurality of file elements comprising a respective image;

for each of the plurality of user interface files:
  generate a platform agnostic data structure having the same logical tree structure as the plurality of file elements by at least:
    traversing the logical tree structure of the plurality of file elements, and for each one of the plurality of file elements:
      generating a node in the platform agnostic data structure;
      performing a luminance calculation of the text or image of the file element, the luminance calculation being based on:
        a hexadecimal string when the file element does not comprise the respective image; and
        a grey scaling process when the file element comprises the respective image;
      storing a result of the luminance calculation of the file element in the node;
  perform an accessibility test on each node in the platform agnostic data structure at least by:
    determining whether each file element meets a minimum or enhanced contrast ratio for accessibility compliance for users who have color vision deficiency based on the results of the luminance calculations for the plurality of file elements;
    flagging file elements that fail to meet the minimum or enhanced contrast ratio for users who have color vision deficiency; and
    generate a test report indicating the flagged file elements that fail to meet the minimum or enhanced contrast ratio for users who have color vision deficiency.

11. The test device of claim 10, wherein the processing circuitry is further configured to:

identify a selected user interface file from the plurality of user interface files.

12. The test device of claim 11, wherein the selection of the user interface file includes:

opening each file of the plurality of user interface files; and searching each of the plurality of user interface files for a predetermined keyword associated with the development platform.

13. The test device of claim 10, wherein the processing circuitry is further configured to, for each user interface file of the plurality of user interface files:

search for a supporting file associated with the user interface file in a file directory where the user interface file is stored; and if the supporting file is found in the file directory, move the user interface file and the supporting file to a processing directory, the data structure being generated based on the user interface file and the supporting file in the processing directory.

14. The test device of claim 10, wherein the processing circuitry is further configured to verify and select a parser to traverse the logical tree structure of the plurality of file elements.

15. The test device of claim 10, wherein the logical tree structure comprises a root node and a plurality of children nodes with respect to the root node.

16. The test device of claim 15, wherein the processing circuitry is further configured to, for each user interface file of the plurality of user interface files:

open the user interface file; and make a first file element of the plurality of file elements the root node, the first file element being:
  positioned, in the user interface file, before the remaining plurality of file elements; and
  associated with a text or an image.

17. The test device of claim 16, wherein the processing circuitry is further configured to make a second file element that is nested under the first file element a child node of the root node.

18. The test device of claim 15, wherein the processing circuitry is further configured to generate a test result indicating whether each node in the logical tree structure passed or failed the accessibility test.

\* \* \* \* \*